United States Patent
Chaput et al.

(10) Patent No.: US 7,300,561 B2
(45) Date of Patent: Nov. 27, 2007

(54) OXIDE ION CONDUCTIVE CERAMIC MEMBRANE STACKED MICROSTRUCTURES; USE FOR SEPARATING OXYGEN FROM AIR

(75) Inventors: Christophe Chaput, Limoges (FR); Thierry Terracol, Limoges (FR); Gisèle Bach, Limoges (FR); Guylaine Gouriou, Guyancourt (FR); Pascal Del Gallo, Dourdan (FR)

(73) Assignee: L'Air Liquide, Societe Anonyme a Directoire et Conseil de Surveillance Pour l'Etude et l'Exploitation des Procedes Georges Claude, Paris (FR)

(*) Notice: Subject to any disclaimer, the term of this patent is extended or adjusted under 35 U.S.C. 154(b) by 356 days.

(21) Appl. No.: 10/470,172

(22) PCT Filed: Dec. 18, 2001

(86) PCT No.: PCT/FR01/04035

§ 371 (c)(1),
(2), (4) Date: Feb. 17, 2004

(87) PCT Pub. No.: WO02/058829

PCT Pub. Date: Aug. 1, 2002

(65) Prior Publication Data
US 2004/0146765 A1 Jul. 29, 2004

(30) Foreign Application Priority Data
Jan. 26, 2001 (FR) .................................. 01 01085

(51) Int. Cl.
*C25B 13/04* (2006.01)

(52) U.S. Cl. .......................... 204/295; 429/30; 429/33; 429/40; 429/41; 429/44

(58) Field of Classification Search ................ 204/295; 429/30, 33, 40, 41, 44
See application file for complete search history.

(56) References Cited

U.S. PATENT DOCUMENTS

| 5,935,533 A | 8/1999 | Kleefisch et al. |
| 6,287,716 B1 * | 9/2001 | Hashimoto et al. ........... 429/33 |

(Continued)

FOREIGN PATENT DOCUMENTS

EP 0 424 691 5/1991

(Continued)

OTHER PUBLICATIONS

International Search Report for PCT/FR01/04036.

(Continued)

*Primary Examiner*—Bruce F. Bell
(74) *Attorney, Agent, or Firm*—Christopher J. Cronin (57) ABSTRACT

The invention concerns an oxide ion conductive ceramic membrane, characterized in that it comprises a non-null finite volume with non-null total thickness E, comprising a dense layer (CD) of a solid electrolyte, a so-called bonding layer (CA), of two porous electrodes (EP) and (EP'), two porous current collectors (CC) and (CC'), and at least at least a coating porous layer (ER), characterized in that the thickness E of the volume of said membrane, is equal to the sum of the thickness of each of said elements. The membrane is used for separating oxygen from air or from a gas mixture containing same.

70 Claims, 4 Drawing Sheets

U.S. PATENT DOCUMENTS 6,428,920 B1 * 8/2002 Badding et al. ............... 429/30
6,475,657 B1 * 11/2002 Del Gallo et al. ............ 429/30
6,492,051 B1 * 12/2002 Gopalan et al. .............. 429/31

FOREIGN PATENT DOCUMENTS

WO     WO 96 28856     9/1996
WO     WO 98 48923     11/1998

OTHER PUBLICATIONS

Boivin, J.C. and G. Mairesse. "*Recent Material Developments in Fast Oxide Ion Conductors*." Chem. Mat., 1998, pp. 2870-2888.

* cited by examiner

OXIDE ION CONDUCTIVE CERAMIC MEMBRANE STACKED MICROSTRUCTURES; USE FOR SEPARATING OXYGEN FROM AIR

The invention relates to the field of solid-state electrochemistry.

BACKGROUND OF THE INVENTION

Elementary electrochemical cells used to separate oxygen from air, or from a gas mixture containing it, are generally formed from a ternary system consisting of solid electrolyte/electrodes/current collectors.

The solid electrolytes used for separating oxygen from a gas mixture are doped ceramic oxides, which, at the operating temperature, are in the form of a crystal lattice having oxide ion vacancies. The associated crystal structures may, for example, be fluorite, perovskite or brown-millerite cubic phases called aurivillius phases; J. C. Boivin and G. Mairesse have referenced all the $O^{2-}$ anionic conducting crystal phases in a general article (Chem. Mat., 1998, p. 2870-2888, "Recent Material Developments in Fast Oxide Ion Conductors").

The electrode materials associated with the solid electrolyte are generally perovskites. These are materials possessing a crystal structure of the $ABO_3$ or $AA'BB'O_6$ type (A, A': lanthanide and/or actinide; B, B': transition metals) based on the structure of natural perovskite $CaTiO_3$. These materials exhibit good hybrid (ionic/electronic) conductivity properties thanks to this cubic crystal structure, in which the metal ions lie at the corners and at the centre of an elementary cube and the oxygen ions at the middle of the edges of this cube. The electrode materials may also be perovskite material/purely ionic conducting material mixtures or else mixtures based on materials possessing other crystal phases, for example of the aurivillius, brown-millerite or pyrochlore type.

Current is collected either by a metal or a metal lacquer or by a metal/"inert oxide" (such as alumina) ceramic mixture, or by a metal/carbide (such as silicon carbide) mixture or by a metal/nitride (such as silicon nitride) mixture, in which the principle role of the oxide, carbide or nitride is that of mechanically blocking the segregation/sintering phenomena that appear owing to the high operating temperatures (700° C.<T<900° C.), especially when silver is used as current collector metal, or by a metal/"hybrid conductor" oxide ceramic (such as an oxide of the perovskite structure of the family of strontium-doped lanthanum manganites) mixture or by a metal/"ionic conductor" oxide ceramic (such as yttrium-stabilized zirconia) mixture.

However, the Applicant has found that when a tubular electrochemical cell, in which the solid electrolyte is zirconium oxide stabilized with 8 mol % yttrium oxide (8% YSZ), the electrodes are made of $La_{0.9}Sr_{0.1}MnO_{3-\delta}$(LSM) and the current collectors are a silver lacquer, is operated at a temperature of between 700 and 900° C., whether at atmospheric pressure or under an internal oxygen pressure of between 1 and $50\times10^5$ Pa (1-50 bar) or under an external oxygen pressure of between 100 and $150\times10^5$ Pa (100-150 bar), this cell is observed to undergo accelerated ageing. This is manifested by a 70% increase in the cell voltage in 40 hours of operation.

By replacing the silver lacquer current collectors with 50/50 vol % Ag/(8% YSZ) or 50/50 vol % Ag-LSM "cermet" (metal/ceramic mixtures) current collectors, the rate of ageing is greatly reduced. However, the degradation phenomenon is not completely eliminated as a 6 to 20% increase in the total voltage is observed for 100 hours of operation. When the cell works under an internal oxygen pressure of between 1 and $50\times10^5$ Pa (1-50 bar) for temperatures of between 750° C. and 800° C., a lowering of the coulombic efficiency and a drop in the potential may also be observed.

L. S. Wang and S. A. Barnett have described the use of $LaCoO_3$ for coating stabilized zirconia-based cells coated with an Ag/YSZ mixture. These studies have shown that after operating for 150 hours at 750° C., the (50/50) YSZ/Ag-YSZ/$LaCoO_3$ layer system did not lose silver, unlike the system without the "protective" $LaCoO_3$ layer, for which there was segregation and loss of silver mass by evaporation over time. However, the $LaCoO_3$ perovskite does not have good hybrid conductivity properties.

The Applicant started from the assumption that, in the case of silver-lacquer-based current collectors, the ageing or degradation of the system ($1<P<50\times10^5$ Pa) and the drop in coulombic efficiency under pressure ($P>20\times10^5$ Pa) and at high temperature (800° C.) were consequences of the poor architecture of the cell used.

The term "architecture" is understood to mean the structures and microstructures of the various constituent materials of the ceramic membrane, namely the solid electrolyte (8 mol % YSZ, yttrium-stabilized zirconia), the electrode (LSM: strontium-doped lanthanum manganite) and the current collector (silver lacquer or silver/oxide or non-oxide ceramic cermet on the cathode side; gold lacquer on the anode side).

The term "structure" is understood to mean the chosen system of stacked layers and the order of the various coatings deposited in order to make up an electrochemical cell (solid electrolyte/electrode/current collector) and the geometrical shapes (tube, plate) of the membranes.

The term "microstructure" is understood to mean the thicknesses, densities, areas and roughness within the various materials characterizing the membrane, the sizes and morphologies of the grains and/or particles of the various materials, the intergranular and intragranular porosity of the solid electrolyte, the nature (morphology) of the surface of the solid electrolyte, the porosity and stacking of particles of the various coatings (electrode, current collector).

The Applicant assumed that, under certain operating conditions (temperature, oxygen pressure, applied current density), the use of silver as current collector results in segregation/sintering of this metal at temperatures above 750° C., in its evaporation, accentuated by hot-air flushing of the cell at temperatures above 700° C. and in its diffusion under pressure ($20\times10^5$ Pa) through the solid electrolyte at high temperature (>780° C.). Such diffusion could depend not only on the operating conditions allowing the possible presence of silver in quasi-liquid form, but also on the use of ceramic membranes of low density (less than 95%) which have a high intergranular and intragranular porosity and an unsuitable microstructure, both in terms of grain size of the solid electrolyte and of grain boundaries.

After having observed, after operation, debonding of the electrode/current collector coatings on the internal surface of the membrane, that is to say on the anode side where the oxygen is produced, and debonding of the electrode/current collector interfaces in the cells used hitherto, the Applicant also assumed that this phenomenon could be due to the absence of developed specific surface area and roughness on the internal or external surface of the solid electrolyte.

SUMMARY OF THE INVENTION

The Applicant therefore sought a means of limiting, or even stopping, the degradation processes described above.

This is why the subject of the invention is a ceramic membrane conducting by oxide ions, characterized in that it comprises a non-zero finished volume of non-zero total thickness T, comprising:

a) a dense layer (DL) of a solid electrolyte having, at the electrolysis temperature, a crystal structure conducting by oxide ions, of non-zero thickness $t_0$ and of opposed external surfaces $S_0$ and $S'_0$ that are identical or different;

b) a layer called the tie layer (TL) that possesses either a crystal structure conducting by oxide ions or a hybrid conducting crystal structure or a mixture of the two aforementioned crystal structures, the said tie layer being pressed against the surface $S_0$ of the dense layer (DL), having a non-zero thickness $t_1$, an external surface $S_1$, a specific surface area $S_{1\omega}$ and a roughness $R_1$;

c) two porous electrodes (PE) and (PE') that are hybrid conductors, of identical or different chemical compositions, pressed one against the surface $S_1$ of (TL) and the other against the surface $S'_0$ of (DL), the said electrodes having, respectively, external surfaces $S_2$ and $S'_2$ of non-zero area, that are identical or different, and non-zero thicknesses $t_2$ and $t'_2$, that are identical or different; and d) two porous current collectors (CC) and (CC'), of identical or different chemical compositions, pressed against the surfaces $S_2$ and $S'_2$ of (PE) and (PE'), the said current collectors (CC) and (CC') having external surfaces $S_3$ and $S_3'$ of non-zero area, that are identical or different, and non-zero thicknesses $t_3$ and $t'_3$, that are identical or different, respectively;

e) at least one porous covering layer (CL) formed from a material or a mixture of materials chemically compatible with the materials, or mixtures of materials, of the said electrodes, current collectors, tie layer and solid electrolyte, the sintering temperature of which is very close to the sintering temperatures of the constituent materials, or mixtures of materials, of the said electrodes, current collectors, tie layer and solid electrolyte, the said layer (CL) being pressed either against the surface $S_3$ of (CC) or against the surface $S_3'$ of (CC'), the said covering layer having a surface $S_4$ and a non-zero thickness $t_4$; and characterized in that the thickness T of the volume of the said membrane is equal to the sum of the thicknesses of each of the elements mentioned.

According to a first particular aspect, the subject of the invention is a membrane as defined above, in which the finished volume of thickness T includes a second tie layer (TL') possessing either a crystal structure conducting by oxide ions or a hybrid conducting crystal structure or a mixture of the two aforementioned crystal structures, the said second tie layer being pressed against the surface $S'_0$ of the dense layer (DL), and against the external surface $S'_1$ of which the electrode (PE') is pressed, the said layer (TL') having a non-zero thickness $t'_1$, a specific surface area $s'_{1\omega}$ and a roughness $R'_1$.

According to a second particular aspect, the subject of the invention is a membrane as defined above, in which the finished volume of thickness T includes a second porous covering layer (CL') made of a material or a mixture of materials that are chemically compatible with the materials or mixtures of materials of the said electrodes, current collectors, tie layers and solid electrolyte, the sintering temperature of which is very close to the sintering temperatures of the constituent materials or mixtures of materials of the said electrodes, current collectors and solid electrolyte, the said layer (CL) being pressed against that one of the surfaces $S'_3$ of (CC') or $S_3$ of (CC) that is not coated with the layer (CL), the said layer (CL') having a surface $S'_4$ and a non-zero thickness $t'_4$.

In the membrane as defined above, the finished volume of thickness T may also include an intermediate layer $(IL_{23})$ made of materials coming from the electrode (PE) and from the current collector (CC), the said layer $(IL_{23})$ having a thermal expansion coefficient $(TEC_{23})$ of between that, $TEC_2$, of (PE) and that, $TEC_3$, of (CC) and preferably greater than the $TEC_2$ and less than $TEC_3$, and being pressed against the surface $S_2$ of (PE), and against the external surface $S_{23}$ of which the collector (CC) is pressed, the said layer $IL_{23}$ having a non-zero thickness $t_{23}$, a specific surface area $s_{23\omega}$ and a roughness $R_{23}$.

It may also include a second intermediate layer $(IL'_{23})$ made of materials coming from the electrode (PE') and from the current collector (CC'), the said layer $(IL'_{23})$ having a thermal expansion coefficient $(TEC'_{23})$ of between that, $TEC'_2$, of (PE') and that, $TEC'_3$, of (CC') and preferably greater than the $TEC'_2$ and less than $TEC'_3$, and being pressed against the surface $S'_2$ of (PE'), and against the external surface $S'_{23}$ of which the collector (CC') is pressed, the said layer $IL'_{23}$ having a non-zero thickness $t'_{23}$, a specific surface area $S'_{23\omega}$ and a roughness $R'_{23}$.

It may also include an intermediate layer $(IL_{34})$ made of materials coming from the current collector (CC), and from the covering layer (CL), the said layer $(IL_{34})$ having a thermal expansion coefficient $(TEC_{34})$ of between that, $TEC_3$, of (CC) and that, $TEC_4$, of (CL) and preferably greater than the $TEC_3$ and less than $TEC_4$, and being pressed against the surface $S_3$ of (CC), and against the external surface $S_{34}$ of which the covering layer (CL) is pressed, the said layer $IL_{34}$ having a non-zero thickness $t_{34}$, a specific surface area $S_{34\omega}$ and a roughness $R_{34}$.

Finally, it may include a second intermediate layer $(IL'_{34})$ made of materials coming from the current collector (CC'), and from the covering layer (CL'), the said layer $(IL'_{34})$ having a thermal expansion coefficient $(TEC'_{34})$ of between that, $TEC'_3$, of (PE') and that, $TEC'_4$, of (CL') and preferably greater than the $TEC'_3$ and less than $TEC'_4$, and being pressed against the surface $S'_3$ of (CC'), and against the external surface $S'_{34}$ of which the covering layer (CL') is pressed, the said layer $IL'_{34}$ having a non-zero thickness $t'_{34}$, a specific surface area $S'_{34\omega}$ and a roughness $R'_{34}$.

As the examples described later in the present description will illustrate, the role of the developed specific surface area(s) and roughness(es) on the faces $S_0$ and $S'_0$ of the solid electrolyte is to allow better "bonding" of the successive superjacent coatings, electrodes, current collectors and protective layers, to increase "volumewise" the "triple" points by delocalizing the oxygen reduction/oxidation reactions, in order to improve the electrochemical performance of the cells, and to limit the degradation phenomena that may occur under the operating conditions over the course of time, these being due in particular to the extraction of the oxygen produced and to the Joule effect.

The expression "crystal structure conducting by oxide ions" is understood to mean, within the context of the present invention, any crystal structure which, at the operating temperature, is in the form of a crystal lattice possessing oxide ion vacancies. The associated crystal structures may, for example, be fluorite, perovskite or brown-millerite cubic phases called aurivillius phases or else those phases mentioned in J. C. Boivin and G. Mairesse, Chem. Mat., 1998, pp. 2870-2888, *"Recent Material Developments in Fast Oxide Ion Conductors"*.

The expression "material or mixture of materials chemically compatible with that of the solid electrolyte, electrodes or current collectors" is understood to mean in the present description any material or mixture of materials that, at a sintering temperature of between about 600° C. and 1 200 C, does not enter into a chemical reaction with that or those of the layer that it coats. Such a chemical reaction would possibly be manifested by the appearance of one or more chemical compounds absent from the initial materials or mixtures of materials.

The term "porous" indicates in the present description that the layers of materials in question must be capable of allowing dioxygen to diffuse. In general, their porosity index is between 10% and 70%, more precisely between 30 and 60%.

The term "specific surface area" of the "tie" layer means that the specific surface area developed by the said layer is between 0.01 and 500 m²/g, more precisely between 0.1 and 50 m²/g.

The term "roughness" of the "tie" layer means that the roughness of the said layer is between 0 and 500 µm and more particularly between 10 and 300 µm.

The term "hybrid conducting" means in the present description that the layers of materials in question are both ionic and electronic conductors.

The expression "very similar sintering temperatures" means that the difference between the sintering temperatures of the "tie" layer and of the solid electrolyte, of the intermediate layer and of the subjacent and superjacent layers and of the porous covering layer and of the current collector is less than or equal to about 500° C., preferably less than 300° C. This is because, when this difference becomes too great, an interlayer delamination phenomenon is observed, this being a sign of poor adhesion of the sintered layers. The development of the specific surface area/roughness of the surface of the solid electrolyte must allow better adhesion/bonding of the various successive layers and in fact prevent the phenomena of delamination and flaking of the successive porous layers.

According to a third particular aspect, the subject of the invention is a membrane as defined above, characterized in that $t_2 = t'_2$.

According to a fourth particular aspect, the subject of the invention is a membrane as defined above, characterized in that $t_3 = t'_3$.

According to a fifth particular aspect, the subject of the invention is a membrane as defined above, characterized in that $t_1 = t'_1$.

According to a sixth particular aspect, the subject of the invention is a membrane as defined above, characterized in that $t_{23} = t'_{23}$.

According to a seventh particular aspect, the subject of the invention is a membrane as defined above, characterized in that $t_{34} = t'_{34}$.

According to an eighth particular aspect, the subject of the invention is a membrane as defined above, characterized in that $t_4 = t'_4$.

In the ceramic membrane forming the subject-matter of the present invention, the thickness $t_0$ is in general between about 0.01 mm and about 2 mm and more particularly between about 0.05 mm and about 1 mm, the thicknesses $t_1$ and $t'_1$ are is in general between about 1 µm and 500 µm and more particularly between 10 µm and 300 µm, the thicknesses $t_2$ and $t'_2$ are in general between about 1 µm and about 500 µm and more particularly between about 10 µm and about 300 µm, the thicknesses $t_3$ and $t'_3$ are in general between about 1 µm and about 500 µm and more particularly between about 20 µm and about 300 µm, the thicknesses $t_4$ and $t'_4$ are in general between about 1 µm and about 500 µm and more particularly between about 20 µm and about 300 µm, the thicknesses $t_{23}$ and $t'_{23}$ are in general between about 1 µm and about 500 µm and more particularly between about 10 µm and about 300 µm and the thicknesses $t_{34}$ and $t'_{34}$ are in general between about 1 µm and 500 µm and more particularly between 10 µm and 300 µm.

The ceramic membrane forming the subject-matter of the present invention may consist of a plate of plane area S and thickness T and is characterized in that each area of the surfaces $S_0$, $S'_0$, $S_1$, $S_2$, $S'_2$, $S_3$, $S'_3$, $S_4$ and, where appropriate, $S'_1$, $S'_4$, $S_{23}$, $S'_{23}$, $S_{34}$ and $S'_{34}$, is equal to the area of S. In this case, the length L of the plate is in general between about 1 cm and about 1 m, and more particularly between 5 cm and about 50 cm, and its width w between about 1 cm and about 1 m, and more particularly between 5 cm and about 50 cm.

The membrane forming the subject-matter of the present invention may also have a tubular shape open at both ends or at only one of its ends. It then consists of a hollow cylinder open at both its ends or at only one of them, of outside diameter D and inside diameter d and is characterized in that the support layer is the dense layer (DL) of the solid electrolyte, in that the surfaces $S_0$, $S'_0$, $S_1$, $S_2$, $S'_2$, $S_3$, $S'_3$, $S_4$ and, where appropriate $S'_1$, $S'_4$, $S_{23}$, $S'_{23}$, $S_{34}$ and $S'_{34}$, are cylindrical and coaxial and in that the thickness T is of the membrane is equal to half of the difference (D–d). In this case, its length L is between about 1 cm and about 1 m and more particularly between 10 cm and 50 cm.

The solid electrolyte (DL) used in the ceramic membrane forming the subject-matter of the present invention is generally chosen from doped ceramic oxides that, at the operating temperature, are in the form of a crystal lattice with oxide ion vacancies. More particularly, they possess a fluorite structure and are preferably chosen from compounds of formula (I):

$$(M_\alpha O_\beta)_{1-x}(R_\gamma O_\delta)_x \qquad (I)$$

in which M represents at least one trivalent or tetravelent atom chosen from Bi, Ce, Zr, Ga, Th or Hf, α and β are such that the structure $M_\alpha O_\beta$ is electrically neutral, R represents at least one divalent or trivalent atom chosen from Mg, Ca, Ba, Sr, Gd, Sc, Yb, Y, Sm or La, γ and δ are such that the structure $R_\gamma O_\delta$ is electrically neutral and x is generally between 0.05 and 0.30 and more particularly between 0.075 and 0.15.

A solid electrolyte may consist, for example, of a single oxide $MO_2$ combined with one or more oxides $R_\gamma O_\delta$ or else a mixture of oxides $MO_2$ combined with one or more oxides $R_\gamma O_\delta$.

As ceramic oxides of formula $M_\alpha O_\beta$, there are mainly zirconium oxide ($ZrO_2$), cerium oxide ($CeO_2$), hafnium oxide ($HfO_2$), thorium oxide ($ThO_2$), gallium oxide ($Ga_2O_3$) or bismuth oxide ($Bi_2O_3$). These oxides are doped with one or more oxides chosen generally from magnesium oxide (MgO), calcium oxide (CaO), barium oxide (BaO), strontium oxide (SrO), gadolinium oxide ($Gd_2O_3$), erbium oxide ($Er_2O_3$), indium oxide ($In_2O_3$), niobium oxide ($Nb_2O_3$), scandium oxide ($Sc_2O_3$), ytterbium oxide ($Yb_2O_3$), yttrium oxide ($Y_2O_3$), samarium oxide ($Sm_2O_3$) and lanthanum oxide ($La_2O_3$).

As main examples of solid electrolytes, there are stabilized zirconias (zirconium oxides), gallates (materials based on gallium oxide), BiMeVOx-type materials or cerium oxides.

According to a ninth particular aspect, the subject of the invention is a membrane as defined above, characterized in that the solid electrolyte is yttrium-oxide-stabilized zirconium oxide of formula (Ia):

$$(ZrO_2)_{1-x}(Y_2O_3)_x \qquad (Ia)$$

in which x is between 0.05 and 0.15 (called hereinafter YSZ (x in mol %)). These compounds work at temperatures of between 700 and 1000° C.

The electrodes (PE) and (PE') associated with the solid electrolyte, having identical or different chemical compositions, are especially made of a material or of a mixture of materials having a perovskite ($ABO_3$) or similar structure (pyrochlore ($A_2B_2O_7$), brown-millerite ($A_2B_2O_5$)) or BiMeVOx (aurivillius phases).

Perovskite materials—the main electrode materials, are represented by the formula (II):

$$M_1M_2O_3 \qquad (II)$$

in which $M_1$ represents one or more atoms chosen from families of alkaline-earth metals, lanthanides and actinides and more particularly chosen from La, Ce, Pr, Nd, Pm, Sm, Eu, Gd, Tb, Dy, Ho, Er, Tm, Yb, Lu, Y or Mg, Ca, Sr and Ba, and $M_2$ represents one or more atoms chosen from the transition metals, more particularly chosen from Sc, Ti, V, Cr, Mn, Fe, Co, Ni, Cu and Zn.

According to a tenth particular aspect, the subject of the invention is a membrane as defined above, characterized in that the electrodes, of identical or different compositions, are more particularly chosen from lanthanum nickel oxide ($LaNiO_3$), calcium lanthanum manganites ($Ca_uLa_vMnO_w$), lanthanum strontium manganites ($La_uSr_vMnO_w$), lanthanum strontium cobaltites ($La_uSr_vCoO_w$), calcium lanthanum cobaltites ($Ca_uLa_vCoO_w$), gadolinium strontium cobaltites ($Gd_uSr_vCoO_w$), lanthanum strontium chromites ($La_uSr_vCrO_w$), lanthanum strontium ferrites ($La_uSr_vFeO_w$) and lanthanum strontium ferrocobaltites ($La_uSr_vCo_dFe_cO_w$), in which u+v and c+d are equal to 1 and w is such that the structure in question is electrically neutral.

The layers (TL) and, where appropriate (TL'), developed on either side of the ceramic membrane have a composition identical to or different from that of the dense layer (DL) of the solid electrolyte defined above.

The subject of the invention is preferably a ceramic membrane, as defined above, in which the layers (TL) and (TL') have a chemical composition identical to that of the dense solid electrolyte layer DL.

In this case and according to an eleventh particular aspect, the subject of the invention is a ceramic membrane as defined above, characterized in that it comprises a non-zero finished volume of non-zero total thickness T, comprising:

a) a layer of a solid electrolyte with a continuous controlled surface porosity gradient (CE) having, at the electrolysis temperature, a crystal structure conducting by oxide ions, with a non-zero thickness $t_0+t_1+t'_1$ and of opposed external surfaces $S_1$ and $S'_1$ of identical area, identical specific surface areas $s_{1\omega}$ and $s'_{1\omega}$ and identical roughness $R_1$ and $R'_1$;

b) two hybrid conducting porous electrodes (PE) and (PE'), of identical or different chemical compositions, pressed against each of the surfaces $S_1$ and $S'_1$ of (CE), the said electrodes having external surfaces $S_2$ and $S'_2$ of identical or different non-zero areas and identical or different non-zero thicknesses $t_2$ and $t'_2$, respectively; and c) two porous current collectors (CC) and (CC'), of identical or different chemical compositions, pressed against the surfaces $S_2$ and $S'_2$ of (PE) and (PE'), the said current collectors (CC) and (CC') having external surfaces $S_3$ and $S_3'$ of identical or different non-zero areas and identical or different non-zero thicknesses $t_3$ and $t'_3$, respectively;

d) at least one porous covering layer (CL) made of a material, or a mixture of materials, chemically compatible with the materials or the mixtures of materials of the said electrodes, current collectors and solid electrolyte with a continuous controlled surface porosity gradient, the sintering temperature of which is very close to the sintering temperatures of the constituent materials, or mixtures of materials, of the said electrodes, current collectors and solid electrolyte, the said layer (CL) being pressed either [lacuna] the surface $S_3$ of (CC) or against the surface $S_3'$ of (CC'), the said covering layer having a surface $S_4$ and a non-zero thickness $t_4$;

and characterized in that the thickness T of the volume of the said membrane is equal to the sum of the thicknesses of each of the layers mentioned.

The composition of the tie layers (TL), and where appropriate (TL'), may also be a mixture of the various constituent materials of the ceramic membrane, namely the solid electrolyte, the electrodes, the current collectors and the protective layer or layers. In this case, the composition of the tie layers (TL), and where appropriate (TL'), are preferably either a mixture of the constituent materials of the solid electrolyte and the electrodes (PE) and (PE') or a mixture of the constituent materials of the electrodes (PE) and (PE') and most particularly made of a mixture of compounds of formula (Ia) and formula (II). The tie layers (TL) and where appropriate (TL') have in the latter case identical or different chemical compositions.

The current collectors (CC) and (CC'), pressed against the said two porous electrodes (PE) and (PE'), of identical or different chemical compositions, consist essentially either of a metal or of a metal lacquer and more particularly a gold lacquer or of a silver lacquer, or a metal/"inert oxide" ceramic mixture, more particularly a metal/alumina mixture, or of a metal/"hybrid conductor" oxide ceramic mixture and more particularly a metal/perovskite material mixture, or of a metal/"ionic conductor" oxide ceramic mixture and more particularly a metal/yttrium (8 mol %)-stabilized zirconia mixture or of a metal/"electronic conductor" oxide ceramic mixture and more particularly a metal/nickel oxide mixture, or of a metal/carbide mixture, and more particularly a metal/silicon carbide mixture, or of a metal/nitride mixture and more particularly a metal/silicon nitride mixture, or of a mixture of one or more of the mixtures defined above.

The current collector may also be defined as being obtained from one or more of the mixtures defined above, to which mixture(s) pore-forming agents may or may not have been added during the synthesis phase.

The term "pore-forming agent" denotes any material capable of being eliminated by thermal decomposition during the binder-removal step prior to sintering, leaving pores in the material obtained after this step and without leaving any residues. As pore formers, polymers existing in particulate form and relatively isotropic form are preferred, such as, for example, micronized polypropylene waxes (for example, PropylTex™270S or PropylTex™325S from MicroPowders, Inc.), polyamides (for example ORGASOL™ from Elf Atochem), latices, polytetrafluorethylene, and polystyrene spheres. Cellulose fibres (for example ARBOCEL™BE600-10 from Rettenmeier), starch (for example standard corn starch, standard SP wheat starch, or potato starch from Roquette Fréres, REMYRISE™DR rice starch from Rémy) fibres or graphite fibres are also used as pore formers.

The metal used in the current collectors is mainly chosen from transition metals, more particularly from silver, copper and nickel, or from noble metals, more particularly from gold, platinum and palladium. They may also be current collector wires based on oxidizable materials covered with non-oxidizable materials or alloys, such as for example a thin layer of gold, silver or platinum or a mixture of two or three of these elements.

The current collectors are more particularly made of a mixture of a metal chosen from silver and gold, with one or more compounds of formula (I) as defined above, with the optional addition of pore-forming agents, or made of a mixture of a metal chosen from gold and silver, with one or more compounds of formula (II) as defined above, with the optional addition of pore-forming agents, or made of a mixture of a metal chosen from silver and gold, with one or more compounds of formulae (I) and (II) as defined above, with or without the addition of pore-forming agents.

The two current collectors most particularly have an identical composition and are either made of a mixture of silver and yttrium-oxide-doped zirconia, preferably (8%) YSZ, or a mixture of silver with one or more compounds of formula (II), preferably strontium-doped lanthanum manganite (LSM) and most particularly $La_{0.9}Sr_{0.1}MnO_{3-\delta}$, or of a silver/"ionic conductor" ceramic/"hybrid conductor" ceramic mixture and preferably the mixture Ag/(8%)YSZ/LSM.

The covering layer (CL) and where appropriate the covering layer (CL') have identical or different compositions. They may be hybrid or electronic conductors or they may be insulating, while still being sufficiently porous to allow gaseous diffusion of oxygen on both sides of the membrane.

When they are insulating, they may be made of an enamel.

When they are hybrid conductors, they may be made, for example, of a perovskite material or a mixture of perovskite materials or a mixture of perovskite materials or of similar families (pyrochlores, brown-millerite) and of purely ionic conductors or of a mixture of metallic conducting materials and of one or more of the compounds defined above.

According to a twelfth particular aspect, the subject of the invention is a ceramic membrane as defined above, in which the covering layers (CL), and where appropriate (CL'), are insulating.

According to a thirteenth particular aspect, the subject of the invention is a ceramic membrane as defined above, in which the covering layers (CL), and where appropriate (CL'), are made of compounds or mixtures of compounds of formula (II) and more particularly of compounds of formula $La_uSr_vCo_dFe_cO_w$ in which u+v and c+d are equal to 1 and w is such that the structure in question is electrically neutral, and preferably of a compound of formula (IIa):

$$La_{0.8}Sr_{0.2}Co_{0.8}Fe_{0.2}O_w \qquad (IIa)$$

in which w is such that the structure of formula (IIa) is electrically neutral.

According to a fourteenth particular aspect, the subject of the invention is a ceramic membrane as defined above, in which each of the current collectors (CC) and (CC') is connected to the external part of the circuit via an electronically conducting wire made of a metal identical to or different from that of which the said current collectors are composed.

According to a variant of the present invention, the cylindrical ceramic membrane, of developed specific surface area/roughness on the solid electrolyte, as defined above, is filled with mullite or zirconia or alumina beads so as to improve the fastening of the said wire to the said current collector. The nature of the beads may also be of the metallic or metal carbide type, or of beads of mullite or zirconia or alumina that is covered with a current collector layer having the same nature as or a different nature from the current collector layer of the tubular electrochemical cell. The beads may also be of the perovskite type of the same chemical composition as, for example, the protective layer.

The ceramic membrane of developed specific surface area/roughness on the solid electrolyte faces S and S', forming the subject of the present invention, is prepared by successive sequences consisting of the deposition of a given commercially available material followed by the sintering of the resulting combination, using the solid electrolyte as material for supporting the said membrane and possessing, on both sides, a developed or non-developed surface area/roughness, which may or may not be of the same type as the solid electrolyte material. These sequences of operations are well known to those skilled in the art. In general, the solid-electrolyte ceramic membrane is produced by carrying out one or more conventional ceramic forming techniques such as, for example, cold isostatic pressing, hot isostatic pressing, extrusion, tape casting, or screen printing. The tie layers allowing the development of the specific surface area and the roughness on both sides on the surfaces $S_0$ and $S'_0$ of the solid electrolyte are deposited either on the green membrane (before sintering) or on the presintered membrane or on the ceramic membrane after sintering.

The development of the specific surface area and the roughness consists in depositing, on the surface of the ceramic membrane, a coating containing either the same material as the solid electrolyte, or one or more of the constituent materials of the electrical cell, or a mixture of constituent materials of the electrochemical cell. The coatings of this "tie" layer on the dense solid electrolyte of planar and/or tubular shape are produced by techniques well known to those skilled in the art, namely, but not exhaustively, by spraying a powder suspension onto the solid electrolyte, by depositing a powder suspension by filling/draining (dip coating) or by depositing a powder suspension with a brush (painting).

After the "tie" layer has been deposited, the ceramic membrane is either sintered so as to obtain an assembly comprising the (TL), the (DL) and, where appropriate, (TA') and possessing, on these external $S_1$ and optionally $S'_1$ surfaces, the specific surface area ($s_{1\omega}$ and $s'_{1\omega}$) and roughness $R_1$ and $R'_1$, or receives the successive electrode, current collector and protective layer layers successively. The successive coatings (electrode, current collector, protective layer and optionally intermediate layer(s) between the various coatings in order to harmonize the TECs) are carried out by painting, spraying, dip coating or screen printing, whether on the internal face or the external face of the device. After each layer has been deposited, a sintering is carried out in air, at the sintering temperature of the said material—between 600° C. and 1500° C. depending on the materials—for a few hours, generally from 0.25 to 10 hours. Likewise, the solid electrolyte of specific surface area/roughness, ceramic membrane of tubular, planar or elliptical geometrical shape, is prepared from commercially available products and formed using methods known to those skilled in the art and described above. The term "specific surface area" is understood to mean a surface area of between 0.01 and 500 m$^2$/g and more particularly between 0.1 and 50 m$^2$/g. The term "roughness R" is understood to mean a value of between 0 and 500 μm and more precisely between 10 and 300 μm.

A variant consists in carrying out the manufacturer of the dense solid electrolyte possessing a specific surface area/ roughness on the surface in a single step. This method is described in French Patent Application No. 00/15919 filed on 7 Dec. 2000. It comprises the following steps:

- a step ($P_a$) of preparing a suspension of solid pore formers (particles, fibres or flakes) or a mixture of solid pore formers of different size and/or shape and/or nature in a solvent, if necessary in the presence of a binder and/or a plasticizer, and/or of another organic compound soluble in the solvent;
- a step ($P_b$) of casting the said suspension formed in step ($P_a$);
- a step ($P_c$) of evaporating the said solvent in order to form a porous pore-former substrate;
- a step ($Q_a$) of preparing a suspension of solid ceramic particles in a solvent in the presence of a dispersant;
- a step ($Q_b$) of adding a binder and optionally a plasticizer to the suspension prepared in step ($Q_a$);
- a step ($Q_d$) of deaerating the said suspension;
- a step (A) of infiltrating the porous pore-former substrate of controlled thickness with the ceramic suspension,
- a step (B) of evaporating the solvent in order to form a pore-former/solid ceramic composite structure;
- a step (B') of cutting the composite structure into structure elements ($S_i$);
- a step of back-to-back stacking of elements $S_i$ in pairs in order to form an assembly (A);
- a thermocompression step carried out on (A);
- a binder-removal step (C); and
- a sintering step (D).

According to a penultimate aspect of the present invention, the subject of the latter is the use of a ceramic membrane as defined above for separating oxygen from air or from a gas mixture containing it and more particularly for producing ultrapure oxygen (purity >99.9%) and at a pressure having more particularly values of between 1 and 50×10$^5$ Pa (between 1 and 50 bar) in the case of production on the inside of tubular units and between 1 and 150×10$^5$ Pa (between 1 and 150 bar) in the case of production on the outside of the tube in a closed chamber.

The subject of the invention is also the use of a membrane as defined above for analysing the presence of oxygen in a gaseous atmosphere.

According to a final aspect of the present invention, the subject of the latter is a process for preparing ultrapure oxygen, consisting in separating oxygen from air by ionic conduction through a ceramic membrane, as defined above, a process for eliminating the oxygen from a gaseous atmosphere in which applications requiring atmospheres having a low oxygen content or containing no oxygen are carried out, consisting in separating oxygen from the said atmosphere by ionic conduction through the said ceramic membrane and a process for producing thermal and electrical energy within a solid fuel cell by reaction of oxygen and hydrogen, characterized in that the said oxygen is obtained by being separated from the air through the said ceramic membrane.

DETAILED DESCRIPTION OF PREFERRED EMBODIMENTS

The following examples illustrate the invention without, however, limiting it.

A) Preparation of the Electrochemical Cell

Figure 1A:
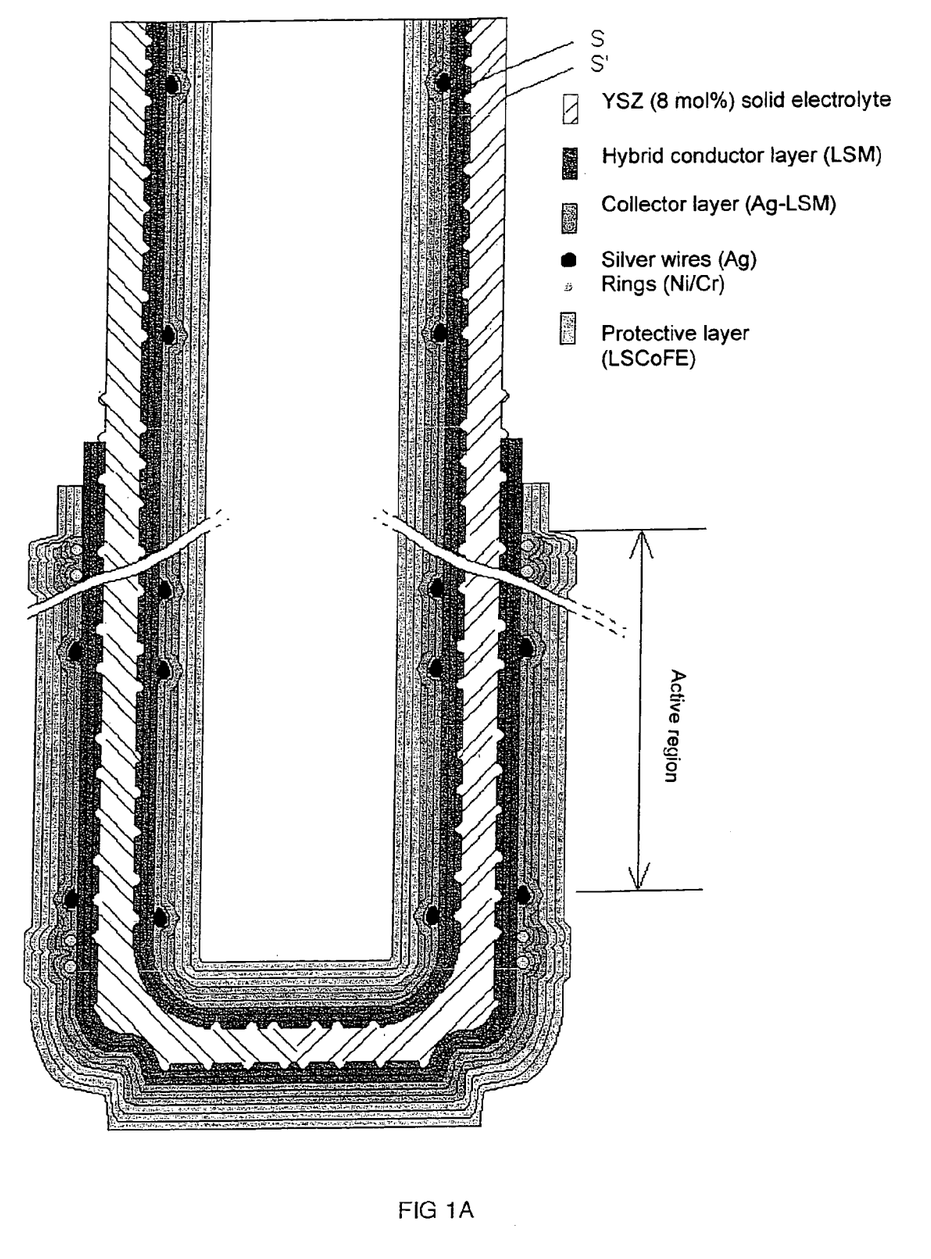
FIG. 1A shows the electrchemical properties of a tubular cell having developed specific surface area/roughness on both its faces of S and S'.

The electrochemical properties of a tubular cell illustrated in FIG. 1A, having developed specific surface area/roughness on both its faces S and S', were analysed.

The cell consisted of:

a YSZ (8 mol %) dense solid electrolyte of specific surface area ($s_\omega$, $s'_\omega$)/roughness (R, R') of the same type (identical coating thicknesses: t'=t");

two electrodes made of strontium-doped lanthanum manganite (LSM), in this case $La_{0.9}Sr_{0.1}MnO_{3-\delta}$;

two current collectors based on Ag-LSM (50/50 by volume) cermet; and two protective layers obtained from the family of lanthanum ferrocobaltites, in this case LScoFE ($La_{0.8}Sro_{0.2}Co_{0.6}Feo_{0.2}O_w$).

After each layer ("tie" layer, electrode, current collector, protective layer) had been deposited, the tube was sintered in air at temperatures between 600 and 1500° C. for a few hours, with temperature holds of between 0.25 hours and 6 hours. The system was perfectly symmetrical in terms of deposition.

Figure 1B:
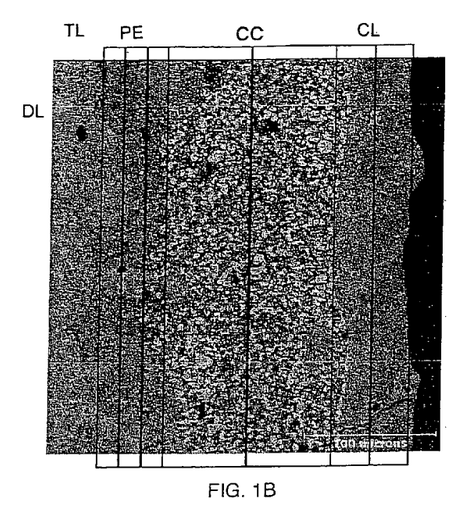
FIG. 1B shows the structure/microstructure of a cell defined in terms of coating thicknesses, sizes, shapes of particles and interfacial states.

FIG. 1B shows the structures/microstructures of the cell described above in terms of coating thicknesses, sizes and shapes of particles, interfacial states.

The SEM photograph reveals the various thicknesses of the successive layers:

Layer (DL): 1 mm [YSZ (8 mol %)];

Layer (TL): 1-100 μm surface area/roughness [YSZ (8 mol %)];

Electrode (PE): 16-30 μm (LSM);

Current collector (CC): 100-120 μm (Ag-LSM);

Covering layer (CL): 50-90 μm/protective layer (LSCoFe).

EXAMPLE 1

Influence of the Architecture and Structure/Microstructure of YSZ (8 mol %) Ceramic Cells/Operating Parameters—Temperature: 750-780° C.; Pressure (Internal Oxygen Pressure): $10 \times 10^5$ Pa (10 Bar): Current: 10-15 A Several tubular electrochemical cells (Cell 1 to Cell 4) were prepared, these consisting of:
- a solid electrolyte made of yttrium-stabilized zirconia [(8%)YSZ] of 350 mm length, 68 cm² active surface area and 9 mm inside diameter;
- two electrodes made of strontium-doped lanthanum manganite (LSM: $La_{0.9}Sr_{0.1}MnO_x$) of 15 to 30 μm thickness and 30 to 50% porosity;
- two current collectors of various compositions:
  silver lacquer (thickness: 100-120 μm, low porosity) (Cell 1) or
  Ag-LSM (50/50 by volume) cermet (thickness: 100-120 μm; porosity between 30 and 50%) (Cell 2, Cell 3, Cell 4); and, optionally
- a protective layer on each of the faces of the LSCoFe ($La_{0.8}Sr_{0.2}Co_{0.8}Fe_{0.2}O_w$) membrane (Cell 3, Cell 4) (thickness: 50-90 μm, porosity: 20-70%) (deposition conditions: 800° C./0.5-2 h).

The cells had a thickness of either 0.5 mm, in the case of units having silver or Ag-LSM cermet current collectors (Cell 1, Cell 2) or of 0.92 mm in the case of units having Ag-LSM cermet current collectors and LSCoFe protective layers or without a "tie" surface (Cell 3, Cell 4). Among the membranes tested, one of them also had (Cell 4) specific surface area/roughness on the surface of the YSZ solid electrolyte and of the same type (cf. FIGS. 1A and 1B).

The tubular units were operated continuously for at least 5 days (120 hours) at $10 \times 10^5$ Pa (10 bar) of oxygen at 750 or 780° C. (oxygen production inside the cells).

The lifetime of the units (from a few days to more than one month) depended on the architectures and structures/microstructures of the ceramic membranes (choice of current collector, presence or otherwise of a protective layer, absence or otherwise of specific surface area/roughness on the surface of the solid electrolyte).

In all situations, the coulombic efficiency (ratio of the experimental $O_2$ output/theoretical $O_2$ output) was 100%.

The units with no protective layer based on ferrocobaltite (LSCoFe) and no specific surface area/roughness on the surface of the solid electrolyte, degraded very rapidly (cell potential increase of 55% after 100 h of continuous operation in the case of the silver-lacquer-based current collector and of 18-20% after 100 h in the case of the silver/LSM cermet-based current collector).

The large initial increases in cell potentials for both cells are firstly due, because of the operating conditions (working temperature: 750-780° C.), and to the flushing with air on the cathode side (on the outside of the units) and to segregation/sintering and/or evaporation phenomena occurring in the silver particles during operation.

The addition of a protective layer on each side of the cell greatly reduced the rate of degradation of the unit (increase in the cell potential of the order of 1% in 100 h of continuous operation) without however finally stopping it. The presence of this layer made it possible to limit the phenomena of current collector layer delamination and to greatly slow down the rate of segregation of the silver particles. The primary cause of the degradation phenomena was no longer those described above, rather the delamination of the various coatings at the interfaces, and mainly at the surface of the dense solid electrolyte.

The tubular unit, having on the surface of the dense solid electrolyte a "tie" layer (development of specific surface area/roughness) of the same nature as the solid electrolyte, namely YSZ (8 mol %), together with a "protective" layer, for, under severer operating conditions (780° C./15 A instead of 750° C./10 A), a change in its cell potential of <1%/1000 h (42 days) of continuous operation. The results are given in FIG. 2 and in Table 1.

Figure 2:
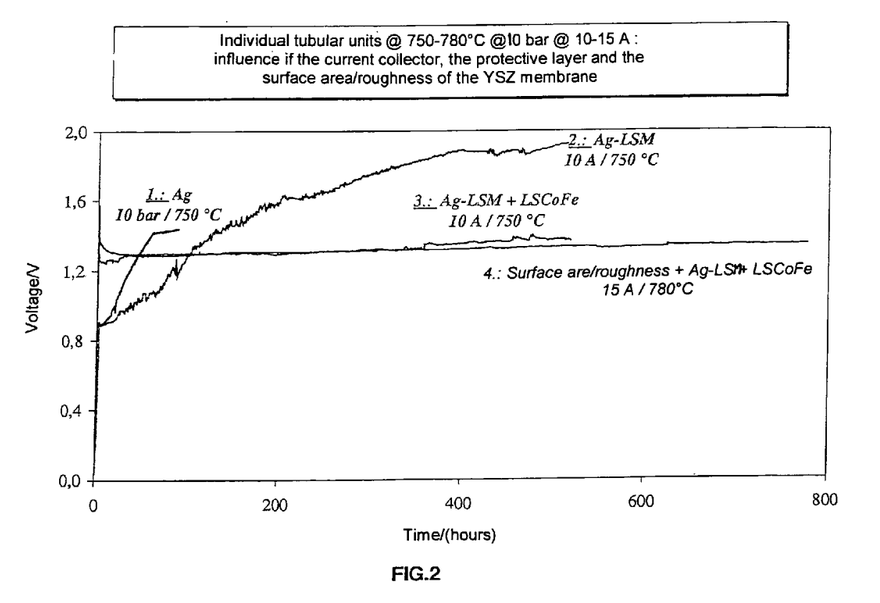
FIG. 2 shows the functions V=f(t) and indicates the electrochemical performance of a YSZ ceramic cell having symmetrical architetecture and structure/microstructures.

FIG. 2 shows the functions V=f(t) and indicates the electrochemical performance of the YSZ ceramic cell having a symmetrical architecture and structures/microstructures according to the invention, compared with cells of the prior art. Each of curves 1 to 4 relates to each of cells 1 to 4, respectively:
- Cell 1: electrodes: LSM; current collectors: silverlacquer; no protective layer; no tie layer on the YSZ membrane;
- Cell 2: electrodes: LSM; current collectors: silver-LSM cermet; no protective layer: no tie layer on the YSZ membrane;
- Cell 3: electrodes: LSM; current collectors: silver-LSM cermet; protective layer: LSCoFe; no tie layer on the YSZ membrane; and
- Cell 4: electrodes: LSM; current collector: silver-LSM cermet; protective layer: LSCoFe; developed surface area/roughness on the YSZ membrane.

TABLE 1

Electrochemical performance of YSZ ceramic cells having a symmetrical architecture and different structures/microstructures

| Cell | Operating conditions | Initial electrochemical performance | Degradation (voltage) |
|---|---|---|---|
| Cell 1 | 750° C./10 bar/80 h | 10 A-0.15 A/cm² - 0.95 V | 55%/100 h |
| Cell 2 | 750° C./10 bar/500 h | 10 A-0.15 A/cm² - 0.95 V | 18-20%/100 h |
| Cell 3 | 750° C./10 bar/500 h | 10 A-0.15 A/cm² - 1.30 V | 1%/100 h |
| Cell 4 | 780° C./10 bar/800 h | 15 A-0.23 A/cm² - 1.30 V | <1%/1000 h |

The changes in the initial potentials of the various units, between 0.95 and 1.3 volts, were partly due to the thermal non-uniformity of some of the furnaces and to the thickness of the dense solid electrolyte (0.5 or 0.92 mm). The various layers (electrodes, current collectors, protective layers) were deposited by the technique of dip coating. The "tie" surface was of the same nature as the dense solid electrolyte (8 mol % YSZ). The internal and external layers were deposited either by spray coating or by dip coating on the pre-sintered solid electrolyte.

Next, the membrane was sintered before deposition of the various layers.

EXAMPLE 2

Influence of the Microstructures of the Various Coatings Deposited on YSZ (8 mol %) Ceramic Cells with Specific Surface Area/Roughness. Operating Parameters: Temperature: 780-800° C.; Pressure (Internal Oxygen Pressure): $10 \times 10^5$ Pa (10 Bar); Current: 10-15-17 A Several tubular electrochemical cells (Cell 5 to Cell 7) were prepared, these consisting of:
- a solid electrolyte made of yttrium-stabilized zirconia [YSZ(8%)] having a length of 350 mm, an active area of 68 cm² and an inside diameter of 9 mm, and exhibiting specific surface area/roughness on both surfaces of the YSZ solid electrolyte and of the same nature, and with a roughness R and R' of between 10 μm and 100 μm;

two electrodes made of strontium-doped lanthanum manganite (LSM: $La_{0.9}Sr_{0.1}MnO_x$) with a thickness of 15 to 30 μm and a porosity of 30 to 50%;

two current collectors made of an Ag-LSM (50/50 by volume) cermet;

thickness: 60 to 80 μm (Cell 5, Cell 7) and 120 to 130 μm (Cell 6); porosity: between 30 and 50%); and a protective layer on each of the faces of the LSCoFe ($La_{0.8}Sr_{0.2}Co_{0.8}Fe_{0.2}O_w$) membrane (Cell 3, Cell 4) (thickness: 30-40 μm (Cell 5, Cell 7) and 60-80 μm (Cell 6); porosity: 20-70%; deposition conditions: 800° C./0.5-2 h).

The cells had a thickness of 0.92 mm.

The variable experimental parameters were the coating thicknesses and the presence or otherwise of one or more intermediate layers between the various coatings. The role of the intermediate layer between two coatings is to harmonize the TECs between the various coatings so as to limit the debonding/delamination phenomena. Only one study case is presented. This involves an intermediate layer between the LSM electrode and the Ag-LSM current collector (Cell 7). The composition of this intermediate layer is YSZ/Ag-LSM (intermediate TEC between the subjacent electrode layer and the superjacent current collector layer).

The operating temperature was either 780 or 800° C. and the temperature gradient was around ±25° C. over the active region.

The various layers (tie surface, electrodes, current collectors, protective layers) were deposited by the technique of dip coating.

The (YSZ+internal and external tie surfaces) systems, whatever the structure (intermediate layer or not) and the microstructure (coating thicknesses), were stable under the operating conditions and degraded by less than 1% after 1 000 h of operation. The coulombic efficiency (the ratio of the experimental output to the theoretical output) was 100%.

The initial potential varied depending on the coating thicknesses, this being, respectively, 1.40 V (current collector thickness 60-80 μm; protective layer: 30-40 μm) and 1.35 V (current collector thickness: 120-130 μm; protective layer: 60-80 μm).

When an intermediate layer (thickness: 10-20 μm) was added between the LSM electrode and the Ag-LSM current collector (thickness: 60-80 μm), the initial potential was 1.50 V. These differences in the initial potentials are due either, for the same structure, to the amount of conducting particles deposited per unit volume, resulting in a lowering of the total resistivity of the coatings, or to the addition of an intermediate layer slightly more resistive than a current collector, resulting in an overvoltage. The results are given in FIG. 3 and in Table 1.

Figure 3:
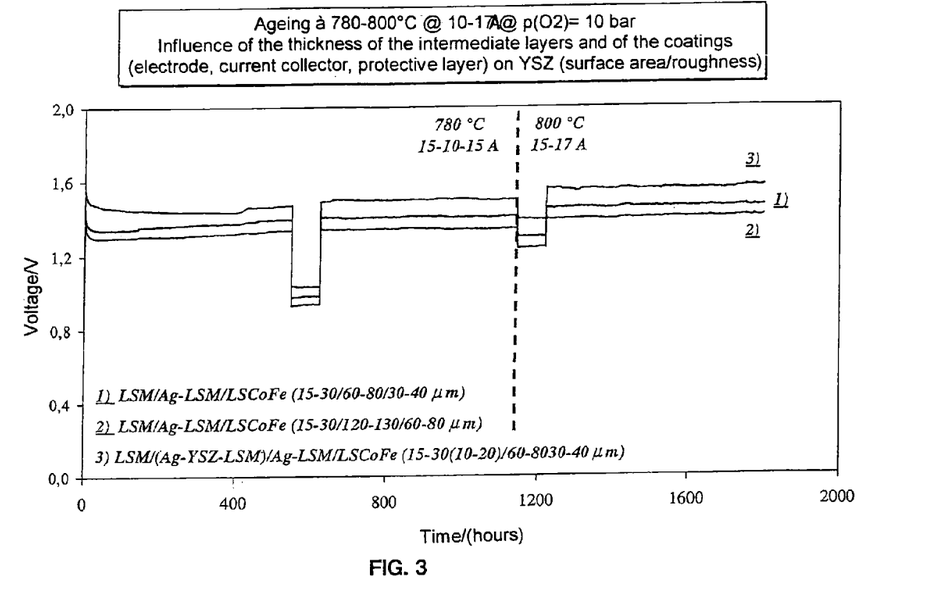
FIG. 3 shows the function v=f(t) and indicates electrochemical performance of the YSZ ceramic cell having symmetrical architecture and structure/microstructures that include intermediate layers between the electrodes and current collectors.

FIG. 3 shows the functions V=f(t) and indicates the electrochemical performance of the YSZ ceramic cell having a symmetrical architecture and structures/microstructures that include intermediate layers between the electrodes and the current collectors according to the invention, compared with cells not having intermediate layers. Each of curves 1 to 3 relates to each of Cells 5 to 7, respectively:

Cell 5: LSM electrode (thickness: 15-30 μm; porosity: 30-50%); current collector: silver/LSM cermet (thickness: 60-80 μm; porosity: 30-50%; protective layer: LSCoFe (thickness: 30-40 μm; porosity: 20-70%); no intermediate layer between the coatings for harmonization of the TECs;

Cell 6: LSM electrode (thickness: 15-30 μm; porosity: 30-50%); current collector: silver/LSM cermet (thickness: 120-130 μm; porosity: 30-50%; protective layer: LSCoFe (thickness: 60-80 μm; porosity: 20-70%); no intermediate layer between the coatings for harmonization of the TECs;

Cell 7: LSM electrode (thickness: 15-30 μm; porosity: 30-50%); current collector: silver/LSM cermet (thickness: 60-80 μm; porosity: 30-50%; protective layer: LSCoFe (thickness: 30-40 μm; porosity: 20-70%); an intermediate layer present between the electrode and current collector coatings for harmonization of the TECs—YSZ/Ag-LSM coating (thickness: 10-20 μm; porosity: 30-50%).

TABLE 2

Electrochemical performance of YSZ ceramic cells with a tie surface and having a different structure (presence or absence of intermediate layers) and different microstructure (thicknesses and porosities) of the coatings)

| Cell | Operating conditions | Initial electrochemical performance | Degradation (voltage) |
|---|---|---|---|
| Cell 5 | 780° C./10 bar/ 1150 h then 800° C./10 bar/ 650 h | 15 A-0.23 A/cm$^2$ – 1.40 V then 17 A-0.25 A/cm$^2$ 1.45 V | <1%/1 000 h |
| Cell 6 | 780° C./10 bar/ 1150 h then 800° C./10 bar/ 650 h | 15 A-0.23 A/cm$^2$ – 1.35 V then 17 A-0.25 A/cm$^2$ 1.40 V | <1%/1 000 h |
| Cell 7 | 780° C./10 bar/ 1150 h then 800° C./10 bar/ 650 h | 15 A-0.23 A/cm$^2$ – 1.50 V then 17 A-0.25 A/cm$^2$ 1.55 V | <1%/1 000 h |

EXAMPLE 3

Module of Ten YSZ (8 mol %) Ceramic Cells Having a Specific Surface Area/Roughness and an LSM (15-30 μm)/Ag-LSM (60-80 μm)/LSCoFe (30-40 μm) Structure/Microstructure. Operating Parameters: Temperature: 780-800° C.: Pressure (Internal Oxygen Pressure): 10×10$^5$ Pa (10 Bar); Current: 10-15-17 A A tubular electrochemical cell identical to that of Example 2, cell 5 in terms of solid electrolyte+"tie" layer, LSM electrode, Ag-LSM cermet current collector and LSCoFe protective layer was used. The system was completely symmetrical.

The basic electrochemical tubular cell constituting the module of ten units consisted of:

a YSZ(8%) solid electrolyte having a length of 350 mm, an active area of 68 cm$^2$ and an inside diameter of 7.5 mm, possessing, internally and externally, a "tie" surface (development of specific surface area/roughness) with a thickness of between 10 and 100 μm;

two electrodes made of strontium-doped lanthanum manganite (LSM: $La_{0.9}Sr_{0.1}MnO_x$) (thicknesses: 15-30 μm; porosity: 30-50%); and two current collectors made of an Ag-LSM (50/50 by volume) cermet (thickness: 60-80 µm; porosity between 30 and 50%) and a protective layer on each of the faces of the membrane made of LSCoFe ($La_{0.8}Sr_{0.2}Co_{0.8}Fe_{0.2}O_w$) (thickness: 30-40 µm; porosity: 30-50%) (deposition conditions: 80° C./0.5 h). The total thickness was 0.92 mm.

The various layers (tie layers, electrodes, current collectors, protective layers) were deposited by dip coating.

The results presented relate to a tubular system consisting of ten elementary electrochemical cells. The system operated continuously for more than 75 days (1 800 hours) at $10 \times 10^5$ Pa (10 bar) of oxygen between 780 and 800° C. (oxygen production in the units). The total potential of the ten-cell system rapidly stabilized (after a few hours) at 15.25 V, i.e. about 1.5 V per cell on average. The coulombic efficiency was 100%.

Figure 4A:
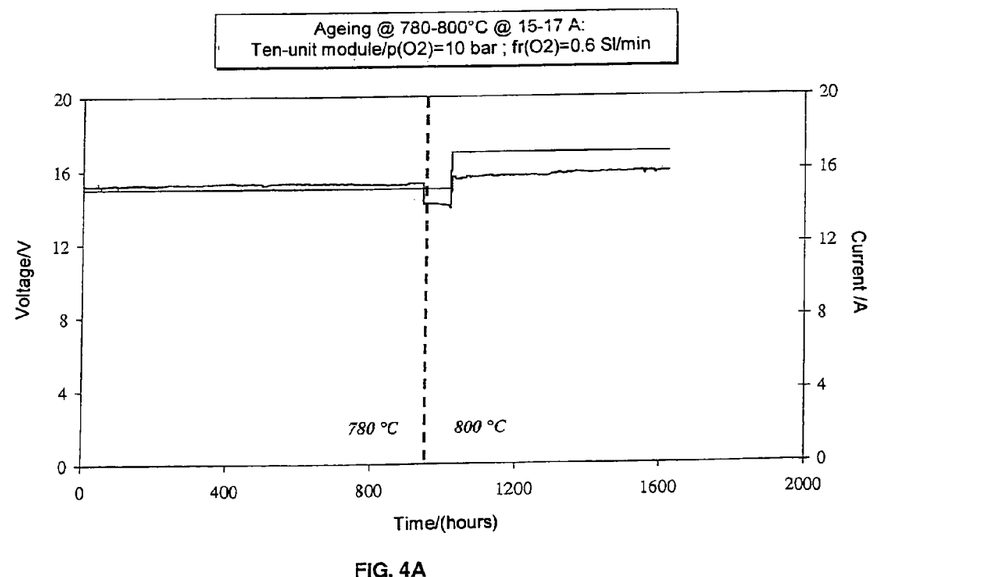
FIG. 4A shows the functions V=f(t) and I=f(t) for a module of ten ceramic membranes with an internal/external "tie" surface and an LSM/AF-LSM/LSCoFe structure.
Figure 4B:
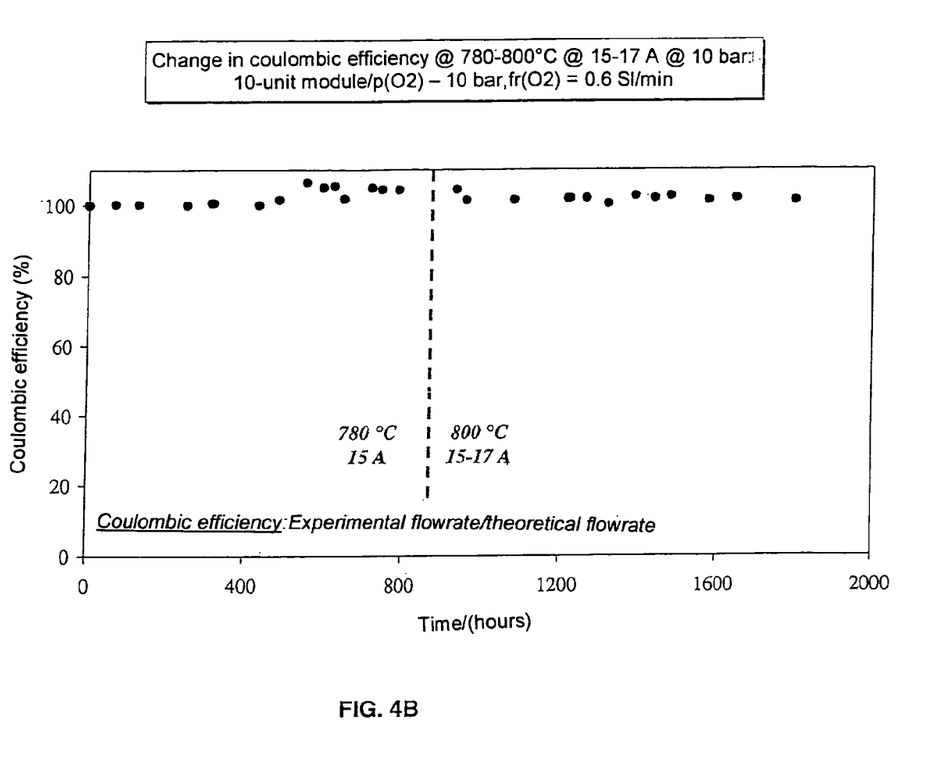
FIG. 4B shows the change in coulombic efficiency over the course of time of a module of ten ceramic membranes with an internal/external "tie" surface and an LSM/AD-LSM/LSCoFe structure.

The results are given in FIGS. 4A and 4B and in Table 3.

FIG. 4A shows the functions V=f(t) and I=f(t) for a module of ten ceramic membranes with an internal/external "tie" surface and an LSM/AG-LSM/LSCoFe structure.

FIG. 4B shows the change in coulombic efficiency over the course of time of a module of ten ceramic membranes with an internal/external "tie" surface and an LSM/AG-LSM/LSCoFe structure.

TABLE 3

Electrochemical performance of a module of ten ceramic membranes with an internal/external "tie" surface and an LSM/Ag-LSM/LSCoFe structure.

| Operating conditions | Initial electrochemical performance | Degradation (voltage) |
| --- | --- | --- |
| 780-800° C./10 bar/ 15 A/1 150 h then | 15 A-0.23 A/cm² - 15.25 V | <1% - 1 000 h |
| 800° C./10 bar/17 A/650 h | 17 A-0.25 A/cm² - 15.70 V | <2%/1 000 h |

EXAMPLE 4

Purity of the Oxygen Produced by a Module of Ten YSZ Units Described in Example 3. Operating Parameters: Temperature: 780-800° C.; Pressure (Internal Oxygen Pressure): $10 \times 10^5$ Pa (10 Bar); Oxygen Flowrate: 0.6 Sl/min (Analysis After Two Months of Continuous Operation)

An analysis of the gas produced ($O_2$) at a pressure of 10 bar was carried out on a 10-unit module after more than two months of continuous operation. The gas analysis was carried out by gas chromatography and mass spectrometry. The results indicated a level of impurities, essentially nitrogen, of less than 100 ppb. The details of the analysis are given in Table 4.

TABLE 4

Analysis of the oxygen produced by a module of ten ceramic membranes with internal/external "tie" surface and LSM/Ag-LSM/LSCoFe structure ($p(O_2)$ = 10 bar; $fr(O_2)$ = 0.6 Sl/min).

| Gas | Level of impurities (ppb) |
| --- | --- |
| Argon (Ar) | ND* < 20 |
| Nitrogen ($N_2$) | 75 |
| Hydrogen ($H_2$) | ND < 5 |
| Methane ($CH_4$) | ND < 5 |
| Hydrocarbons ($C_nH_m$) | ND < 5 |

*ND: Not Detected (content below the detection threshold of the analytical equipment)

CONCLUSION

In the four examples, the addition of LSCoFe-based protective layers very greatly slows down the ageing phenomenon of YSZ units at a low current density (<0.15 A/cm²) and at a low operating temperature (750° C.), without, however, definitively slowing it down over periods in excess of two months. It should be pointed out that the protective layer absolutely must be chemically inert not only with respect to the current collector material but also the materials of the electrode(s) and the solid electrolyte. The development on the dense solid electrolyte of specific surface area/roughness allows better "bonding" of the successive coatings, principally the electrode and the current collector, and at the same time increases the number of what are called "triple" points in electrochemistry (points of contact between the solid electrolyte, the electrode and the gas ($O_2$)).

There is delocalization of the electrode reaction within the volume, and no longer only at the solid electrolyte/electrode "plane" interface.

The consequences of the development of this tie layer, of the same nature as the solid electrolyte and/or the electrode, combined with an electrode/current collector/protective layer structure, are numerous:

stabilization of the degradation of the cells to less than 1%/1000 h of operation on these units for current densities of around 0.20-0.30 A/cm², temperatures of between 750 and 800° C. and oxygen pressures of between 1 and 20 bar;

the operating conditions of the units, compared with "conventional" ceramic membrane systems without a tie layer and with a protective layer, are more severe in terms of productivity (1.5-2 times) and of temperature, with markedly less degradation (increase in cell potentials);

the constancy of the productivity (coulombic efficiency) at 10 bar of oxygen; and the purity of the oxygen produced is of the N60 type, that is to say with a level of impurities of air gases (nitrogen, etc.) of less than 100 ppb.

As further examples giving the advantageous results described above, there are electrochemical cells in which:

the tie layer developed on both faces of the dense solid electrolyte is formed from the same material as the latter. However, it may be made of other constituent materials of the cell, mainly of the same nature as the electrode. In general, these may be materials of ionically conducting crystal structure (dense solid electrolyte: aurivillius, fluorite phases) and/or mixed (brownmillerite, perovskite, pyrochlore) phases;

the tie layer is characterized by the fact that it may, if it is of the same nature as the dense solid electrolyte, be inseparable from the latter. The ceramic membrane is then characterized by a membrane possessing on its faces, on both sides, a specific surface area/roughness. The formation of this tie layer may be obtained either, after sintering, from a ceramic membrane, for example by isostatic pressing, or from a presintered membrane, or from a green membrane;

the intermediate layer is defined as consisting of materials resulting from the subjacent and superjacent coatings. The thermal expansion coefficient of this layer is less than that of the superjacent layer and greater than the subjacent layer. The tie layer may be defined as being an intermediate layer between the solid electrolyte and the electrode. The intermediate layer must be sufficiently porous and of controlled thickness and must not influence the electrochemical performance of the cell. It consists either of ionically conducting materials, or of hybrid conducting materials, or of electronically conducting materials or of a mixture of the aforementioned materials;

the protective layer consists of a perovskite of the LSCoFe or other type, possessing hybrid conductivity properties at low temperature ($<800°$ C.). It may also consist of other ionically or hybrid conducting, crystal structures (aurivillius, brown-millerite, pyrochlore, fluorite phases);

the protective layer does not possess hybrid, ionic or electronic conduction properties. It may be an insulator. However, the layer must be sufficiently porous and of controlled thickness in order to allow oxygen to diffuse within the system and must not influence the electrochemical performance of the cell;

beads of mullite or zirconia or alumina (diameter between 0.2 and 1 mm) may fill the cell so as to chemically fasten the internal silver wire. These beads may optionally be covered with a current collector layer, of the same nature as the current collector layer deposited on the tubular system (silver lacquer, silver-LSM (50/50 vol %) mixture, gold lacquer, etc.). The use of perovskite-type beads may be envisioned, either with the same chemical composition as the protective layer or with a different chemical composition.

The invention is claimed is:

1. An oxide ion conducting ceramic membrane assembly comprising a non-zero finished volume of non-zero total thickness T, that further comprises:
   a) a dense layer (DL) of a solid electrolyte comprising, at the electrolysis temperature, an oxide ion crystal conducting structure, with a non-zero thicknesss $t_0$ and opposed external surfaces $S_0$ and $S'_0$ that are identical or different;
   b) a first tie layer (TL) having a composition the same as that of the layer DL, said tie layer being pressed against the surface $S_0$ of the dense layer (DL), having a non-zero thickness $t_1$, and external surface $S_1$, a specific surface area $s_{1\omega}$ and a roughness $R_1$;
   c) two porous electrodes (PE) and (PE') that are hybrid conductors, comprising identical or different chemical compositions, one pressed against the surface $S'_1$ of (TL) and the other against the surface $S'_1$ of (DL), said electrodes having respectively, external surfaces $S_2$ and $S'_2$ with a non-zero area, that are identical or different, and non-zero thicknesses $t_2$ and $t'_2$, that are identical or different;
   d) a second tie layer (TL') having a composition the same as that of the layer DL, the layer TL' having a non-zero thickness $t'_1$, a specific surface area $s'_{1\omega}$; and a roughness $R'_1$, wherein the layer (TL') is being pressed against the surface $S'_0$ of the dense layer (DL), and against the external surface $S'_1$ of which the electrode (PE') is pressed, an area of surface $S_1$ being identical to an area of surface $S'_1$, specific area $s_{1\omega}$ being identical to the specific area $s'_{1\omega}$, the roughness $R_1$ being identical to roughness $R'_1$;
   e) two porous current collectors (CC) and (CC'), comprising identical or different chemical compositions, pressed against the surfaces $S_2$ and $S'_2$ of (PE) and (PE'), said current collectors (CC) and (CC') having external surfaces $S_3$ and $S'_3$ of non-zero area, that are identical or different, and non-zero thicknesses $t_3$ and $t'_3$, that are identical or different, respectively; and
   f) at least one porous covering layer (CL) formed from a chemical composition chemically compatible with those of said electrodes, current collectors and solid electrolyte, the sintering temperature being very close to the sintering temperatures of the chemical compositions of said electrodes, current collectors, tie layer and solid electrolyte,
   wherein the layer (CL) is pressed either against the surface $S_3$ of (CC) or against the surface $S'_3$ of (CC'), the covering layer comprising a surface $S_4$ and a non-zero thickness $t_4$; and
   wherein said membrane assembly has a tubular shape, consisting of a hollow cylinder open at least at one end, with an outside diameter D and an inside diameter d;
   wherein layer (DL), and surfaces $S_0$, $S'_0$, $S_1$, $S_2$, $S'_2$, $S_3$, $S'_3$, $S_4$ are cylindrical and coaxial;
   wherein a thickness T of the membrane assembly is equal to half of the difference (D-d) and also equal to the sum of the thicknesses of each of the elements of the assembly; and
   wherein the finished volume of thickness T. comprises an intermediate layer ($IL_{23}$) made of materials coming from the electrode (PE) and the current collector (CC);
   wherein said layer ($IL_{23}$) has a thermal expansion coefficient ($TEC_{23}$) between $TEC_2$ of (PE) and $TEC_3$ of (CC);
   wherein said layer is pressed against the surface $S_2$ of (PE), and the external surface $S_{23}$ of which the collector (CC) is pressed, and
   wherein said layer has a non-zero thickness $t_{23}$, a specific surface area $S_{23\omega}$ and a roughness $R_{23}$.

2. The membrane assembly according to claim 1, wherein the finished volume of thickness T further comprises a second porous covering layer (CL') having a chemical composition that is chemically compatible with those of said electrodes, current collectors, tie layers and solid electrolyte;
   wherein the sintering temperature of the chemical composition of layer CL' is very close to the sintering temperatures of the chemical compositions of the electrodes, current collectors and solid electrolyte;
   wherein said layer (CL') is being pressed against the surfaces $S'_3$ of (CC') or $S_3$ of (CC) that is not coated with the layer (CL), and
   wherein said layer (CL') has a surface $S'_4$ and a non-zero thickness $t'_4$.

3. The membrane assembly according to claim 2, wherein $t_4=t'_4$.

4. The membrane assembly according to claim 2, wherein said thicknesses $t_4$ and $t'_4$ range from about 1 μm to about 500 μm 5. The membrane assembly according to claim 4, wherein said thicknesses $t_4$ and $t'_4$ range from about 20 µm to about 300 µm.

6. The membrane assembly according to claim 2, wherein said covering layers (CL), and optionally (CL'), are insulating.

7. The membrane assembly according to claim 2, wherein said covering layers (CL), and optionally (CL'), comprise compounds or mixtures from formula (II);
wherein formula II is $M_1M_2O_3$;
wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and
wherein $M_2$ is at least one atom selected from the group consisting of: Sc, Ti, V, Cr, Mn, Fe, Co, Ni, Cu and Zn.

8. The membrane assembly according to claim 7, wherein said covering layers (CL), and optionally (CL'), comprise compounds in the formula $La_uSr_vCo_dFe_cO_w$;
wherein said u+v and c+d are equal to 1; and
wherein said w is such that the structure is electrically neutral.

9. The membrane assembly according to claim 7, wherein said covering layers (CL) and, optionally, (CL'), comprise a compound from formula (IIa):

$$La_{0.8}Sr_{0.2}Co_{0.8}Fe_{0.2}O_w \qquad (IIa)$$

wherein said w is such that the structure of formula (IIa) is electrically neutral.

10. The membrane assembly according to claim 2, wherein each of the current collectors (CC) and (CC') is connected to the external part of the circuit via an electronically conducting wire comprising a metal identical to or different from that of which the current collectors are composed.

11. The membrane assembly according to claim 1, wherein said layer ($IL_{23}$) has a thermal expansion coefficient ($TEC_{23}$) greater than $TEC_2$ and less than $TEC_3$.

12. The membrane assembly according to claim 1, wherein the finished volume of thickness T further comprises a second intermediate layer ($IL'_{23}$) made of materials coming from the electrode (PE') and the current collector (CC');
wherein said layer ($IL'_{23}$) has a thermal expansion coefficient ($TEC'_{23}$) between $TEC'_2$ of (PE') and $TEC'_3$ of (CC');
wherein said layer is pressed against the surface $S'_2$ of (PE'), and the external surface $S'_{23}$ of which collector (CC') is pressed, and
wherein said layer has a non-zero thickness $t'_{23}$, a specific surface area $s'_{23\omega}$, and a roughness $R'_{23}$.

13. The membrane assembly according to claim 12, wherein said layer ($IL'_{23}$) has a thermal expansion coefficient ($TEC'_{23}$) greater than $TEC'_2$ and less than $TEC'_3$.

14. The membrane assembly according to claim 12, wherein $t_{23}=t'_{23}$.

15. The membrane assembly according to claim 12, wherein said thicknesses $t_{23}$ and $t'_{23}$ range from about 10 µm to about 500 µm.

16. The membrane assembly according to claim 15, wherein said thicknesses $t_{23}$ and $t'_{23}$ range from about 10 µm to about 300 µm.

17. The membrane assembly according to claim 1, wherein the finished volume of thickness T further comprises an intermediate layer ($IL_{34}$) made of materials coming from the current collector (CC) and the covering layer (CL);
wherein said layer ($IL_{34}$) has a thermal expansion coefficient ($TEC_{34}$) between $TEC_3$ of (CC) and $TEC_4$ of (CL);
wherein said layer is pressed against the surface $S_3$ of (CL), and the external surface $S_{34}$ of which the covering layer (CL) is pressed, and
wherein said layer has a non-zero thickness $t_{34}$, a specific surface area $S_{23\omega}$, and a roughness $R_{34}$.

18. The membrane assembly according to claim 17, wherein said layer ($IL_{34}$) has a thermal expansion coefficient ($TEC_{34}$) greater than $TEC_3$ and less than $TEC_4$.

19. The membrane assembly according to claim 17, wherein the finished volume of thickness T further comprises a second intermediate layer ($IL'_{34}$) made of materials coming from the current collector (CC') and the covering layer (CL');
wherein said layer ($IL'_{34}$) has a thermal expansion coefficient ($TEC'_{34}$) between $TEC'_3$ of (PE') and $TEC'_4$ of (CL');
wherein said layer is being pressed against the surface $S'_3$ of (CC'), and the external surface $S'_{34}$, of which the covering layer (CL') is pressed, and
wherein said layer has a non-zero thickness $t'_{34}$, a specific surface area $S'_{34\omega}$, and a roughness $R'_{34}$.

20. The membrane assembly according to claim 19, wherein said layer ($IL'_{34}$) has a thermal expansion coefficient ($TEC'_{34}$) greater than the $TEC'_3$ and less than $TEC'_4$.

21. The membrane assembly according to claim 19, wherein $t_{34}=t'_{34}$.

22. The membrane assembly according to claim 19, wherein said thicknesses $t_{34}$ and $t'_{34}$ range from about 1 µm to about 500 µm.

23. The membrane assembly according to claim 22, wherein said thicknesses $t_{34}$ and $t'_{34}$ range from about 10 µm to about 300 µm.

24. The membrane assembly according to claim 1, wherein $t_2=t'_2$.

25. The membrane assembly according to claim 1, wherein $t_3=t'_3$.

26. The membrane assembly according to claim 1, wherein $t_1=t'_1$.

27. The membrane assembly according to claim 1, wherein said thickness $t_0$ ranges from about 0.01 mm to about 2 mm.

28. The membrane assembly according to claim 27, wherein said thickness $t_0$ ranges from about 0.05 mm to about 1 mm.

29. The membrane assembly according to claim 1, wherein said thicknesses $t_1$ and $t'_1$ range from about 10 µm to about 500 µm.

30. The membrane assembly according to claim 29, wherein said thicknesses $t_1$ and $t'_1$ range from about 10 µm to about 300 µm.

31. The membrane assembly according to claim 1, wherein said thicknesses $t_2$ and $t'_2$ range from about 1 µm to about 500 µm.

32. The membrane assembly according to claim 31, wherein said thicknesses $t_2$ and $t'_2$ range from about 10 µm to about 300 µm.

33. The membrane assembly according to claim 1, wherein said thicknesses $t_3$ and $t'_3$ range from about 1 µm to about 500 µm.

34. The membrane assembly according to claim 33, wherein said thicknesses $t_3$ and $t'_3$ range from about 20 µm to about 300 µm.

35. The membrane assembly according to claim 1, wherein said membrane consists of a plate with a plane area S and thickness T; and wherein each area of the surfaces $S_0$, $S'_0$, $S_1$, $S_2$, $S'_2$, $S_3$, $S'_3$, $S_4$ and, optionally, $S'_1$ is equal to the area of S.

36. The membrane assembly according to claim 35, wherein said plate consists of length L that ranges from about 1 cm to about 100 cm.

37. The membrane assembly according to claim 36, wherein said length L ranges from about 5 cm to about 50 cm.

38. The membrane assembly according to claim 35, wherein said plate consists of width w that ranges from about 1 cm to about 100 cm.

39. The membrane assembly according to claim 38, wherein said width w ranges from about 5 cm to about 50 cm.

40. The membrane assembly according to claim 1, wherein said membrane consists of a length L that ranges from about 1 cm to about 100 cm.

41. The membrane assembly according to claim 4o, wherein said length L ranges from about 10 cm to about 50 cm.

42. The membrane assembly according to claim 1, wherein the solid electrolyte is represented by formula (I):

$$(M_\alpha O_\beta)_{1-x}(R_\gamma O_\delta)_x$$

wherein M is at least one trivalent or tetravalent atom selected from the group consisting of: Bi, Ce, Zr, Ga, Th and Hf;

wherein $\alpha$ and $\beta$ are such that the structure $M_\alpha O_\beta$ is electrically neutral;

wherein R is at least one divalent or trivalent atom selected from the group consisting of: Mg, Ca, Ba, Sr, Gd, Sc, Yb, Y, Sm and La; and wherein $\gamma$ and $\delta$ are such that the structure $R_\gamma O_\delta$ is electrically neutral.

43. The membrane assembly according to claim 42, wherein said x ranges from about 0.05 to about 0.30.

44. The membrane assembly according to claim 43, wherein said x ranges from about 0.075 to about 0.15.

45. The membrane assembly according claim 42, wherein the solid electrolyte is a ceramic oxide or a mixture of ceramic oxides selected from the group consisting of: $ZrO_2$, $CeO_2$, $HfO_2$, $ThO_2$, $Ga_2O_3$ and $Bi_2O_3$; and wherein the solid electrolyte is doped with at least one oxide selected from the group consisting of: MgO, CaO, BaO, SrO, $Gd_2O_3$, $Sc_2O_3$, $Yb_2O_3$, $Er_2O_3$, $Y_2O_3$, $Sm_2O_3$, $In_2O_3$, $Nb_2O_3$ and $La_2O_3$.

46. The membrane assembly according to claim 45, wherein the solid electrolyte is yttrium-oxide-stabilized zirconium oxide of formula (Ia):

$$(ZrO_2)_{1-x}(Y_2O_3)_x \quad (Ia)$$

wherein said x ranges from about 0.05 to about 0.15.

47. The membrane assembly according to claim 1, wherein the electrodes (PE) and (PE') comprise at least one material from formula (II):

$$M_1M_2O_3 \quad (II)$$

wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and wherein $M_2$ is at least one atom selected from the group consisting of: Sc, Ti, V, Cr, Mn, Fe, Go, Ni, Cu and Zn.

48. The membrane assembly according to claim 47, wherein the electrodes, of identical or different compositions, comprise at least one material selected from the group consisting of: $LaNiO_3$, $Ca_uLa_vMnO_w$, $La_uSr_vMnO_w$, $La_uSr_vCoO_w$, $Ca_uLa_vCoO_w$, $Gd_uSr_vCoO_w$, $La_uSr_vCrO_w$, $La_uSr_vFeO_w$ and $La_uSr_vFe_cCo_dO_w$, wherein u+v and c+d are equal to 1; and wherein w is such that the structure in question is electrically neutral.

49. The membrane assembly according to claim 1, wherein the layers (TL) and (TL') contain identical chemical composition to that of the electrodes (PE) and (PE').

50. The membrane assembly according to claim 1, wherein the layers (TL) and (TL') have a chemical composition consisting of at least one compound from formula (Ia) and formula (II);

wherein formula (Ia) is $(ZrO_2)_{1-x}(Y_2O_3)_x$;

wherein said x ranges from about 0.05 to about 0.15; and wherein formula (II) is $M_1M_2O_3$;

wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and wherein $M_2$ is at least one atom selected from the group consisting of: Sc, Ti, V, Cr, Mn, Fe, Co, Ni, Cu and Zn.

51. The membrane assembly according to claim 1, wherein the current collectors (CC) and (CC') comprise at least one metal selected from the group consisting of: a metal, a metal of a metal/"inert oxide" ceramic mixture, a metal/"hybrid conductor" oxide ceramic mixture, a metal/"ionic conductor" oxide ceramic mixture, a metal/"electronic conductor" oxide ceramic mixture, a metal/carbide mixture and a metal/nitride mixture.

52. The membrane assembly according to claim 51, wherein said metal lacquer is either a gold lacquer or a silver lacquer.

53. The membrane assembly according to claim 51, wherein said metal/"inert oxide" ceramic mixture is a metal/alumina mixture.

54. The membrane assembly according to claim 51, wherein said metal/"hybrid conductor" oxide ceramic mixture is a metal/perovskite material mixture.

55. The membrane assembly according to claim 51, wherein said metal/"ionic conductor" oxide ceramic mixture comprises about 8 mol % yttrium metal with a stabilized zirconia mixture.

56. The membrane assembly according to claim 51, wherein said metal/"electronic conductor" oxide ceramic mixture comprises at least one mixture selected from the group consisting of: metal/nickel oxide mixture, metal/carbide mixture, metal/silicon carbide mixture, metal/nitride mixture and a metal/silicon nitride mixture.

57. The membrane assembly according to claim 51, wherein the current collectors (CC) and (CC'), with identical or different compositions, comprise at least one metal selected from the group consisting of: transition metals, noble metals, formula I, and formula II;

wherein formula I is $(M_\alpha O_\beta)_{1-x}(R_\gamma O_\delta)_x$;

wherein M is at least one trivalent or tetravalent atom selected from the group consisting of: Bi, Ce, Zr, Ga, Th and Hf;

wherein $\alpha$ and $\beta$ are such that the structure $M_\alpha O_\beta$ is electrically neutral;

wherein R is at least one divalent or trivalent atom selected from the group consisting of Mg, Ca, Ba, Sr, Gd, Sc, Yb, Y, Sm and La; and wherein γ and δ are such that the structure $R_\gamma O_\delta$ is electrically neutral; and wherein formula II is $M_1M_2O_3$;

wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and wherein $M_2$ is at least one atom selected from the group consisting of: Sc, Ti, V, Cr, Mn, Fe, Co, Ni, Cu and Zn.

58. The membrane assembly according to claim 57, wherein the transition metal comprises at least one metal selected from the group consisting of: silver, copper and nickel.

59. The membrane assembly according to claim 57, wherein the noble metal comprises at least one metal selected from the group consisting of: gold, platinum and palladium.

60. The membrane assembly according to claim 51, wherein the current collectors (CC) and (CC'), containing identical composition, comprise at least one mixture selected from the group consisting of: silver and yttrium-oxide-doped zirconia, silver and with at least one compound selected from the group consisting of: formula II, silver/"ionic conductor" and a ceramic/"hybrid conductor" ceramic mixture, and wherein formula II is $M_1M_2O_3$;

wherein $M_1$ is at least one atom selected from the group consisting of: La, Ce, Pr, Nd, Pm, Sm, Eu, Gd, Tb, Dy, Ho, Er, Tm, Yb, Lu, Y, Mg, Ca, Sr and Ba, and wherein $M_2$ is at least one atom selected from the group consisting of: Sc, Ti, V, Cr, Mn, Fe, Co, Ni, Cu and Zn.

61. The membrane assembly according to claim 60, wherein said silver and yttrium-oxide-doped zirconia comprises about 8% mol YSZ.

62. The membrane assembly according to claim 60, wherein said silver with at least one compound from formula II is strontium-doped lanthanum manganite (LSM).

63. The membrane assembly according to claim 62, wherein said LSM is $La_{0.9}Sr_{0.1}MnO_{3-\delta}$.

64. The membrane assembly according to claim 60, wherein said silver/"ionic conductor" and ceramic/"hybrid conductor" ceramic mixture is Ag, LSM, and about 8% mol YSZ.

65. The membrane assembly according to claim 1, wherein said membrane assembly is adapted and configured to separate oxygen from air or a gas mixture.

66. The membrane assembly according to claim 1, wherein said membrane assembly is adapted and configured to produce ultrapure oxygen under pressure.

67. The membrane assembly according to claim 1, wherein said membrane assembly is adapted and configured to analyze the presence of oxygen in a gaseous atmosphere.

68. The membrane assembly according to claim 1, wherein said membrane assembly is adapted and configured to produce ultrapure oxygen, consisting of separating oxygen from air by ionic conduction through an electrochemical cell.

69. The membrane assembly according to claim 1, wherein said membrane assembly is adapted and configured to eliminate oxygen from a gaseous atmosphere in which applications requiring atmospheres with little or no oxygen content are carried out, consisting of separating oxygen from said atmosphere by ionic conduction.

70. The membrane assembly according to claim 1, wherein said membrane assembly is adapted and configured to produce thermal and electrical energy within a solid fuel cell by reaction of oxygen and hydrogen, and wherein the oxygen is separated from the air.

* * * * *

UNITED STATES PATENT AND TRADEMARK OFFICE
CERTIFICATE OF CORRECTION

PATENT NO. : 7,300,561 B2  Page 1 of 1
APPLICATION NO. : 10/470172
DATED : November 27, 2007
INVENTOR(S) : C. Chaput et al.

It is certified that error appears in the above-identified patent and that said Letters Patent is hereby corrected as shown below:

In Column 20, line 8, replace the word "specific" with the words --the specific--.
In Column 20, line 38, replace "T. comprises" with --T, comprises--.
In Column 20, line 67, insert a --.-- after the words "500 µm".
In Column 21, line 23, replace the words "claim 7" with the words --claim 8--.
In Column 21, line 58, replace the words "10 µm" with the words --1µm--.
In Column 22, line 8, replace the words "area $S_{23}$" with the words --area $S_{34}$--.
In Column 22, line 51, replace the words "10 µm" with the words --1µm--.
In Column 23, line 21, replace the words "claim 4o" with the words --claim 40--.
In Column 23, line 65, replace "Go" with --Co--.

Signed and Sealed this

Thirteenth Day of April, 2010

David J. Kappos
*Director of the United States Patent and Trademark Office*